(12) United States Patent
Pateros et al.

(10) Patent No.: US 7,869,759 B2
(45) Date of Patent: Jan. 11, 2011

(54) SATELLITE COMMUNICATION SYSTEM AND METHOD WITH ASYMMETRIC FEEDER AND SERVICE FREQUENCY BANDS

(75) Inventors: Charles N. Pateros, Carlsbad, CA (US); Mark D. Dankberg, Encinitas, CA (US)

(73) Assignee: ViaSat, Inc., Carlsbad, CA (US)

( * ) Notice: Subject to any disclaimer, the term of this patent is extended or adjusted under 35 U.S.C. 154(b) by 519 days.

(21) Appl. No.: 11/954,654

(22) Filed: Dec. 12, 2007

(65) Prior Publication Data

US 2008/0146145 A1    Jun. 19, 2008

Related U.S. Application Data

(60) Provisional application No. 60/870,080, filed on Dec. 14, 2006.

(51) Int. Cl.
*H04B 7/185* (2006.01)

(52) U.S. Cl. .............. 455/12.1; 455/427; 455/13.3; 455/3.02

(58) Field of Classification Search ......... 455/12.1, 455/7, 9, 3.02, 427, 3.04, 430, 447, 446, 455/452.1, 452.2, 13.2, 13.3, 13.4; 370/316, 370/318, 319, 321
See application file for complete search history.

(56) References Cited

U.S. PATENT DOCUMENTS

| | | | |
|---|---|---|---|
| 5,485,464 A | | 1/1996 | Strodtbeck et al. |
| 5,825,325 A | | 10/1998 | O'Donovan et al. |
| 5,907,541 A | | 5/1999 | Fairholm et al. |
| 6,449,267 B1 | | 9/2002 | Connors |
| 6,512,749 B1 | * | 1/2003 | Wright et al. ............ 455/12.1 |
| 6,690,645 B1 | | 2/2004 | Aweya et al. |
| 6,694,137 B2 | | 2/2004 | Sharon |
| 6,704,543 B1 | | 3/2004 | Sharon et al. |

(Continued)

FOREIGN PATENT DOCUMENTS

EP    1705838 A    9/2006

(Continued)

OTHER PUBLICATIONS

Ramirez, et al., "Single-feed circularly polarized microstrip ring antenna and arrays," IEEE Transactions on Antennas and Propagation, vol. 48, No. 7, p. 1040-1047, Jul. 2000. [retrieved on Mar. 26, 2008]. Retrieved from the internet: <URL: http://www.ece.ucl.edu/rfmems/publications/papers/antenna/J009.pdf>.

(Continued)

*Primary Examiner*—John Lee
(74) *Attorney, Agent, or Firm*—Townsend and Townsend and Crew LLP; Kenneth R. Allen

(57) ABSTRACT

System and method for communicating data in a multibeam satellite system having feeder beams associated with a plurality of gateways and a plurality of service beams associated with a plurality of user subscriber terminals utilizing frequency re-use by service beams between a satellite and a plurality of subscriber terminals, wherein the service beams are transmitted to and from the satellite by re-using at least one common frequency channel of the service beam, such that the beam allocation is asymmetric among available frequency channels. The result is a potential for reduction of transponder resources.

13 Claims, 9 Drawing Sheets

U.S. PATENT DOCUMENTS

| | | | |
|---|---|---|---|
| 6,707,916 B1* | 3/2004 | Caso et al. ............... | 380/258 |
| 6,751,458 B1 | 6/2004 | Wang et al. | |
| 6,778,509 B1 | 8/2004 | Ravishankar et al. | |
| 6,850,732 B2 | 2/2005 | Patterson et al. | |
| 6,865,388 B2 | 3/2005 | Walsh et al. | |
| 6,975,600 B1 | 12/2005 | Vaughan et al. | |
| 6,985,455 B1 | 1/2006 | Heath et al. | |
| 7,010,265 B2 | 3/2006 | Coffin | |
| 7,024,158 B2 | 4/2006 | Wiswell | |
| 7,065,355 B2 | 6/2006 | Spio | |
| 7,319,666 B2 | 1/2008 | Goosman | |
| 7,508,785 B2 | 3/2009 | Dale et al. | |
| 7,535,863 B2 | 5/2009 | Gin et al. | |
| 2001/0053152 A1 | 12/2001 | Sala et al. | |
| 2002/0004369 A1 | 1/2002 | Kelly et al. | |
| 2002/0037734 A1 | 3/2002 | McKenna et al. | |
| 2002/0110094 A1 | 8/2002 | Reddy | |
| 2002/0187747 A1 | 12/2002 | Sawdey et al. | |
| 2003/0032391 A1 | 2/2003 | Schweinhart et al. | |
| 2003/0050008 A1 | 3/2003 | Patterson et al. | |
| 2003/0050060 A1 | 3/2003 | Leslie et al. | |
| 2003/0069034 A1 | 4/2003 | Lee | |
| 2003/0203733 A1 | 10/2003 | Sharon | |
| 2004/0014472 A1* | 1/2004 | de La Chapelle et al. ... | 455/429 |
| 2004/0018849 A1 | 1/2004 | Schiff | |
| 2004/0162020 A1 | 8/2004 | Dale et al. | |
| 2004/0198218 A1 | 10/2004 | Linsky et al. | |
| 2005/0058229 A1 | 3/2005 | Alagha | |
| 2005/0265376 A1 | 12/2005 | Chapman et al. | |

FOREIGN PATENT DOCUMENTS

| | | |
|---|---|---|
| WO | WO 00/52849 A | 9/2000 |
| WO | WO 2008/076877 A2 | 6/2008 |

OTHER PUBLICATIONS

International Search Report PCT/US07/87568.

Satellite One, "Spot Beam Technology," [online], [retrieved on Mar. 6, 2009]. Retreived from the internet <URL: http://www.satelliteone.com/dish/support/Spot_Beam_Short.pdf>.

Connors et al., "A Medium Access Control Protocol For Real Time Video Over High Latency Satellite Channels," Mobile Networks And Applications, ACM, New York, Jan. 1, 2002, pp. 9-20, ISSN: 1383-469X.

Connors et al., "Response Initiated Multiple Access (RIMA), A Medium Access Control Protocol for Satellite Channels," GLOBECOM'00 IEEE Global Telecommunications Conference, New York NY Nov. 27, 2000, pp. 1124-1129. ISBN: 078-0-7803-6452-3.

Elshabrawy, "MAC Architecture for Broadband Satellite Access Systems," Apr. 20. 2000, pp. III-100. [retrieved on May 29, 2008] Retrieved from the internet: <URL:http://users.enc.concordia.ca/{tahar/theses/Tallal-Thesis.pdf>.

Evans et al., "Providing Differentiated Service to TCP Flows Over Bandwidth on Demand Geostationary Satellite Networks," IEEE Journal on Selected Areas in Communications, vol. 22, No. 2, Feb. 1, 2004, pp. 333-347 ISSN: 0733-8716.

Grace et al., "Burst Targeted Demand Assignment Multiple-Access for Broadband Internet Service Delivery Over Geostationary Satellite," IEEE Journal On Selected Areas in Communications, vol. 22, No. 3, Apr. 2004, pp. 546-558. ISSN: 0733-8716.

Le-Ngoc et al., "Performance Analysis of CFDAMA-PB Protocol for Packet Satellite Communications," IEEE Transactions on Communications, vol. 46, No. 9, Sep. 1998.

Mitchell et al., "Improved Medium Access Control For Data Traffic Via Satellite Using The CFDAMA Protocol," IEE Seminar On Broadband Satellite: The Critical Success Factorstechnology, Services And Markets, pp. 18/01-18/07 XP001061698.

Todorova et al., "Quality-of-Service-Oriented Media Access Control for Advanced Mobile Multimedia Satellite Systems," Systems Sciences, 2003. Proceedings of the 36th Hawaii International Conference on System Sciences, Jan. 6-9, 2003, pp. 309-316. ISBN: 978-0-7695-1874-9.

Atia, A.E., "Ka-Band Satellite System Architecture For Local Loop Internet Access," Microwave Symposium Digest, 2001 IEEE MTT-S Digest,International, Phoenix, AZ, (2001) vol. 2, pp. 1133-1136.

Atia, A.E., et al., "Ka-Band Satellite System Architecture For Local Loop Internet Access," Fifth Ka Band Utilization Conference: Oct. 18-20, 1999, Taormina, Italy, (2000) Genova: Instituto Internationale Delle Comunicazioni.

International Preliminary Report on Patentability and Written Opinion for PCT/US2007/087568, dated Jun. 16, 2009, 6 pages total.

Bambos, et al., "*Globally Constrained Power Control Across Multiple Channels In Wireless Data Networks*" Mobile Networks and Applications, Sep. 2001, vol. 6, pp. 427-434.

Bhatia, et al., "*Empirical Evaluation of Upstream Throughput In a DOCSIS Access Network*" 2005 1st International Conference on Multimedia Services Access Networks: Jun. 13-15, 2005.

Hindin, E., "*Saywhat?*" Network World, Aug. 1998, vol. 37, pp. 37-44.

Xiao, Y., "*Efficient MAC Strategies for the IEEE 802.11n Wireless LANs*"Wireless Communications and Mobile Computing, 2006, vol. 6, pp. 453-466.

Xiao, Y., "*IEEE 802.11 Performance Enhancement via Concatenation And Piggyback Mechanisms*" IEEE Transactions on Wireless Communications, Sep. 2005, vol. 4 Issue 5, pp. 2182-2192.

\* cited by examiner

Forward (Downstream) Direction

Return (Upstream) Direction

SATELLITE COMMUNICATION SYSTEM AND METHOD WITH ASYMMETRIC FEEDER AND SERVICE FREQUENCY BANDS

CROSS-REFERENCES TO RELATED AND OTHER APPLICATIONS

This application claims the benefit, under 35 U.S.C 119(e), of U.S. Provisional Patent Application Ser. No. 60/870,080 filed Dec. 14, 2006.

Other patent applications filed within seventy-five days before the filing of the priority application and which involve the general subject matter of this invention and assigned to the assignee of this invention include but may not necessarily be limited to the following:

Listing of patent applications

U.S. Provisional Patent Application No. 60/827,924 filed Oct. 3, 2006 for "Adaptive Use of Satellite Uplink Bands", now U.S. patent application Ser. No. 12/406,861;

U.S. Provisional Patent Application No. 60/827,927, filed Oct. 3, 2006 for "Frequency Re-use for Service and Gateway Beams", now U.S. patent application Ser. No. 12/406,870;

U.S. Provisional Patent Application No. 60/827,959, filed Oct. 3, 2006 for "Satellite Architecture", now U.S. patent application Ser. No. 12/406,880;

U.S. Provisional Patent Application No. 60/827,960, filed Oct. 3, 2006 for "Piggy-back Satellite Architecture", now U.S. patent application Ser. No. 12/406,887;

U.S. Provisional Patent Application No. 60/827,964, filed Oct. 3, 2006 for "Placement of Gateways Away from Service Beams", now U.S. patent application Ser. No. 12/187,051;

U.S. Provisional Patent Application No. 60/828,021, filed Oct. 3, 2006 for "Multi-Service Provider Subscriber Authentication", now U.S. patent application Ser. No. 12/406,847;

U.S. Provisional Patent Application No. 60/828,033, filed Oct. 3, 2006 "Large Packet Concatenation in Satellite Communication System", now U.S. patent application Ser. No. 12/408,543;

U.S. Provisional Patent Application No. 60/828,037, filed Oct. 3, 2006"Upfront Delayed Concatenation In Satellite Communication System", now U.S. patent application Ser. No. 12/406,900;

U.S. Provisional Patent Application No. 60/828,014, filed Oct. 3, 2006 for "Map-Trigger Dump Of Packets In Satellite Communication System", now U.S. patent application Ser. No. 12/408,614;

U.S. Provisional Patent Application No. 60/828,044, filed Oct. 3, 2006 for "Web/Bulk Transfer Preallocation Of Upstream Resources In A Satellite Communication System", now U.S. patent application Ser. No. 12/409,306;

U.S. Continuation in Part Patent Application No. 11/538,431, filed Oct. 3, 2006 for "Code Reuse Multiple Access For A Satellite Return Link", which has been superseded by patent application Ser. No. 12/356,842;

U.S. Continuation in Part Patent Application No. 11/538,429, filed Oct. 3, 2006 for "Method for Congestion Management";

U.S. Provisional Patent Application No. 60/827,985, filed Oct. 3, 2006 for "Aggregate Rate Modem," which has been superseded by patent application Ser. No. 12/174,525;

U.S. Provisional Patent Application No. 60/827,988, filed Oct. 3, 2006 for "Packet Reformatting for Downstream Links," which has been superseded by patent application Ser. No. 12/174,222;

U.S. Provisional Patent Application No. 60/827,992, filed Oct. 3, 2006 for "Downstream Waveform Modification," which has been superseded by patent application Ser. No. 12/174,173;

U.S. Provisional Patent Application No. 60/827,994, filed Oct. 3, 2006 for "Upstream Resource Optimization," which has been superseded by patent application Ser. No. 12/174,674;

U.S. Provisional Patent Application No. 60/827,999, filed Oct. 3, 2006 for "MF-TDMA Frequency Hopping," which has been superseded by patent application Ser. No. 12/174,676;

U.S. Provisional Patent Application No. 60/828,002, filed Oct. 3, 2006 for "Downstream Virtual Channels Multiplexed on a Per Symbol Basis,";

U.S. Provisional Patent Application No. 60/827,997, filed Oct. 3, 2006 for "Broadband Demodulator for Modified Downstream Waveform," which has been superseded by patent application Ser. No. 12/174,196;

U.S. Provisional Patent Application No. 60/828,038, filed Oct. 3, 2006 for "Adapted DOCSIS Circuit for Satellite Media" which has been superseded by patent application Ser. No. 12/411,312;

U.S. Provisional Patent Application No. 60/828,045, filed Oct. 3, 2006 for "Satellite Downstream Virtual Channels," which has been superseded by patent application Ser. No. 12/411,738 for "High Data Rate Multiplexing Satellite Stream to Low Data Rate Subscriber Terminals";

U.S. Provisional Patent Application No. 60/828,035, filed Oct. 3, 2006 for "Satellite Broadband with Less than One Country of Coverage," which has been superseded by patent application Ser. No. 12/411,704 for "Satellite system Optimization";

U.S. Provisional Patent Application No. 60/828,032, filed Oct. 3, 2006 for "Multi-User Detection in Satellite Return Link," which has been superseded by patent application Ser. No. 12/411,694;

U.S. Provisional Patent Application No. 60/828,034, filed Oct. 3, 2006 for "Multi-rate Downstreaming in Multiple Virtual Channel Environment," which has been superseded by patent application Ser. No. 12/411,748;

U.S. Provisional Patent Application No. 60/828,047, filed Oct. 3, 2006 for "Satellite Upstream Load Balancing";

U.S. Provisional Patent Application No. 60/828,048, filed Oct. 3, 2006 for "Satellite Upstream/Downstream Virtual Channel Architecture," which has been superseded by patent application Ser. No. 12/411,744; and U.S. Provisional Patent Application No. 60/828,046, filed Oct. 3, 2006 for "Virtual Downstream Channel Load Balancing," which has been superseded by patent application Ser. No. 12/411,692 for Intra-Domain Load Balancing.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention relates to wireless communications in general and, in particular, to a satellite communications network employing frequency reuse techniques.

Consumer broadband satellite services are gaining traction in North America with the start up of star network services using Ka band satellites. While such first generation satellite systems may provide multi-gigabit per second (Gbps) per satellite overall capacity, the design of such systems inherently limits the number of customers that may be adequately served. Moreover, the fact that the capacity is split across numerous coverage areas further limits the bandwidth to each subscriber.

While existing designs have a number of capacity limitations, the demand for such broadband services continues to grow. The past few years have seen strong advances in communications and processing technology. This technology, in conjunction with selected innovative system and component design, may be harnessed to produce a novel satellite communications system to address this demand.

Communicating data in a multibeam satellite system utilizing frequency re-use in a cellular service footprint is a known technique to attempt to address frequency and spatial constraints. Service beams including uplink service beams and downlink service beams between a satellite and a plurality of subscriber terminals may occupy frequency and polarization slots and each serve a special cell or service beam coverage area. The plurality of the uplink service beams is transmitted to the satellite by re-using at least one common uplink frequency channel, and a plurality of the downlink service beams are transmitted from the satellite by re-using at least one common downlink frequency channel. The method further comprises establishing at least one feeder beam comprising an uplink feeder beam and a downlink feeder beam between the satellite and a gateway terminal, the at least one feeder beam being associated with a feeder beam coverage area separated from the plurality of service beam coverage areas, the uplink feeder beam being received at the satellite to form a plurality of the downlink service beams, a plurality of the uplink service beams being received at the satellite to form the downlink feeder beam. The uplink feeder beam is transmitted to the satellite by re-using the at least one common uplink frequency channel, and the downlink feeder beam is transmitted from the satellite by re-using the at least one common downlink frequency channel.

Notwithstanding, certain satellite configurations result in inefficiencies in allocation of bandwidth and resources, which means that satellites of known designs and configuration carry unnecessary and unused facilities resulting in carriage of precious extra weight impacting the entire design and specifications of the satellite and launch vehicle. It is therefore desirable to not only identify what are unnecessary equipment requirements but also to provide a satellite configuration that better optimizes a satellite size, weight and link budget.

SUMMARY OF THE INVENTION

According to the invention, a method based on mathematical color mapping techniques employs asymmetric feeder and service frequency bands for communicating data in a multibeam satellite system serving multiple service areas. In accordance with industry practice, each color is characterized by a unique frequency band and unique antenna polarization. Each gateway provides an uplink feeder beam consisting of a number of signals of different colors whereas subscriber terminals are segregated among a fewer number of color assignments in each service beam. In one embodiment, each color corresponds to a similar bandwidth signal.

In one embodiment, a conventional four-color reuse pattern for assigning spot coverage areas is modified in that the ratio of some of the four colors in the pattern is not equal, thereby allowing for asymmetric service frequency usage on service downlinks and thereby requiring fewer than the conventional number of types of frequency translators. The invention also provides that the uplink service links employ three identical frequency bandwidths, each with two orthogonal polarizations, and that the downlink feeder links employ two frequency bandwidths, each with two orthogonal polarizations. Frequencies between the uplinks and downlinks are reused asymmetrically according to the invention, which reduces the required number of separate and unique elements on a spacecraft.

According to one embodiment, at least one uplink feeder beam comprises six carriers, wherein the beam comprises three frequency channels, each of the three frequency channels being operatively separated by right hand circular polarization (RHCP) and left hand circular polarization (LHCP), to form six unique combinations of frequency and polarization (colors), and wherein each of the six carriers is transmitted using only one of the six unique combinations of frequency and polarization.

According to a further aspect of the embodiment, the downlink service beams are comprised of one of four carriers, wherein the carriers are chosen from two frequency bands, each of the two frequency bands capable of being separated by right hand circular polarization (RHCP) and left hand circular polarization (LHCP), to form four unique combinations of frequency and polarization (colors), and wherein each of the four carriers is transmitted using one of the four unique combinations of frequency and polarization to spot beam cells according to a four color pattern.

The frequency re-use scheme according to the invention employing six colors per gateway results in a reduction of a requirement by five gateways to a total of ten gateways for a system having sixty service beams, since more beams are handled by each gateway.

Further background on this invention showing another frequency allocation scheme is found in co-pending patent application Ser. No. 60/827,927, already incorporated herein by reference.

The invention will be better understood by reference to the following detailed description in connection with the accompanying drawings.

DETAILED DESCRIPTION OF SPECIFIC EMBODIMENTS

The method described above relates to a satellite system that adopts multiple levels of frequency re-use in an asymmetric manner to maximize usage of available frequency bandwidth and to simplify system hardware. In addition to employing frequency re-use for multiple service beams such that different service beams may occupy a common frequency channel, the system further employs frequency re-use between service beams and feeder beams by locating gateways in regions separated from coverage areas of service beams. In addition, asymmetric frequency use is employed for feeder beams and service beams to allow further gains in gateway efficiency.

Figure 1A:
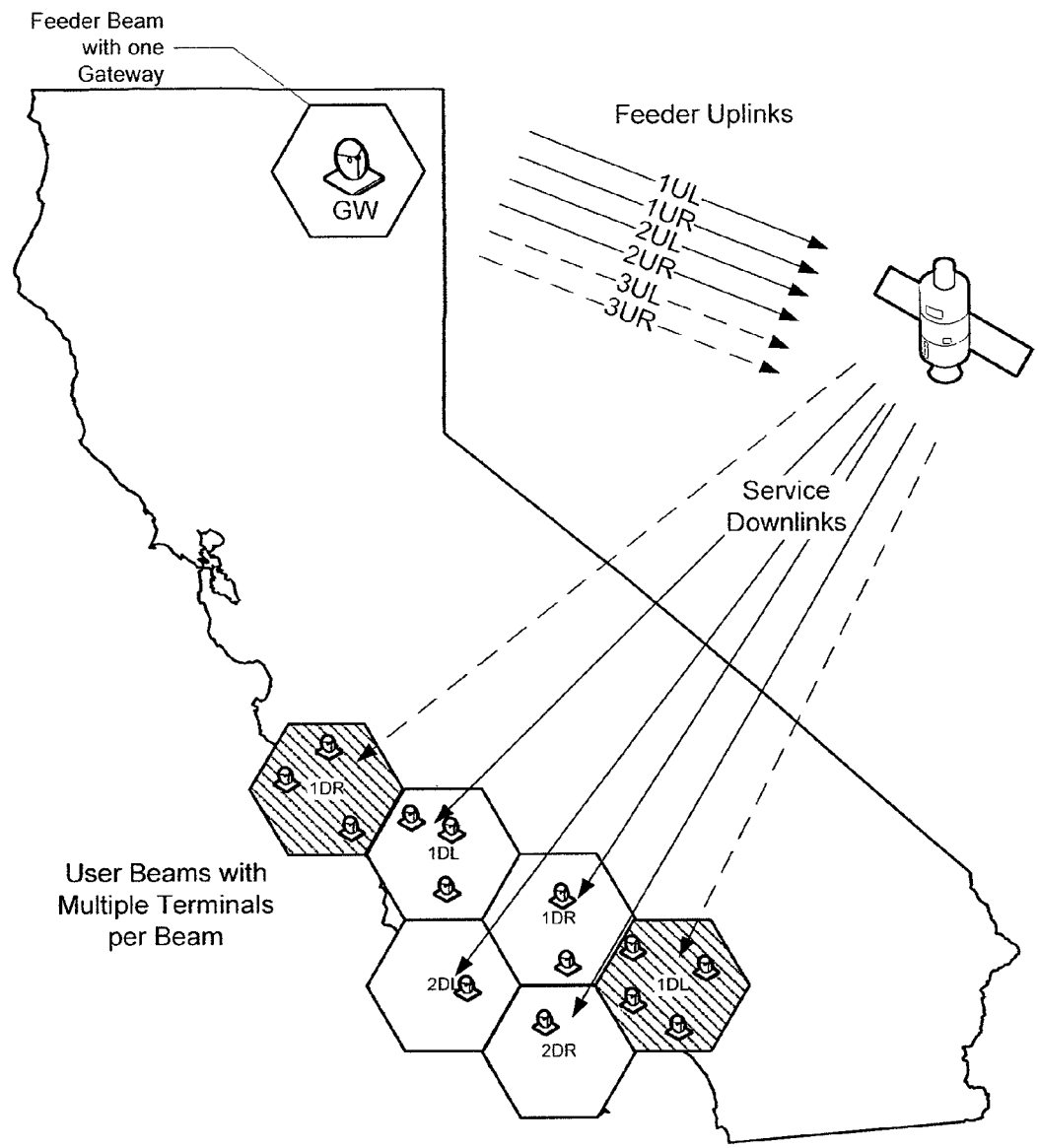
FIG. 1A and FIG. 1B illustrate forward and reverse path communication between a single gateway and a set of spot beam service areas according to the invention.
Figure 1B:
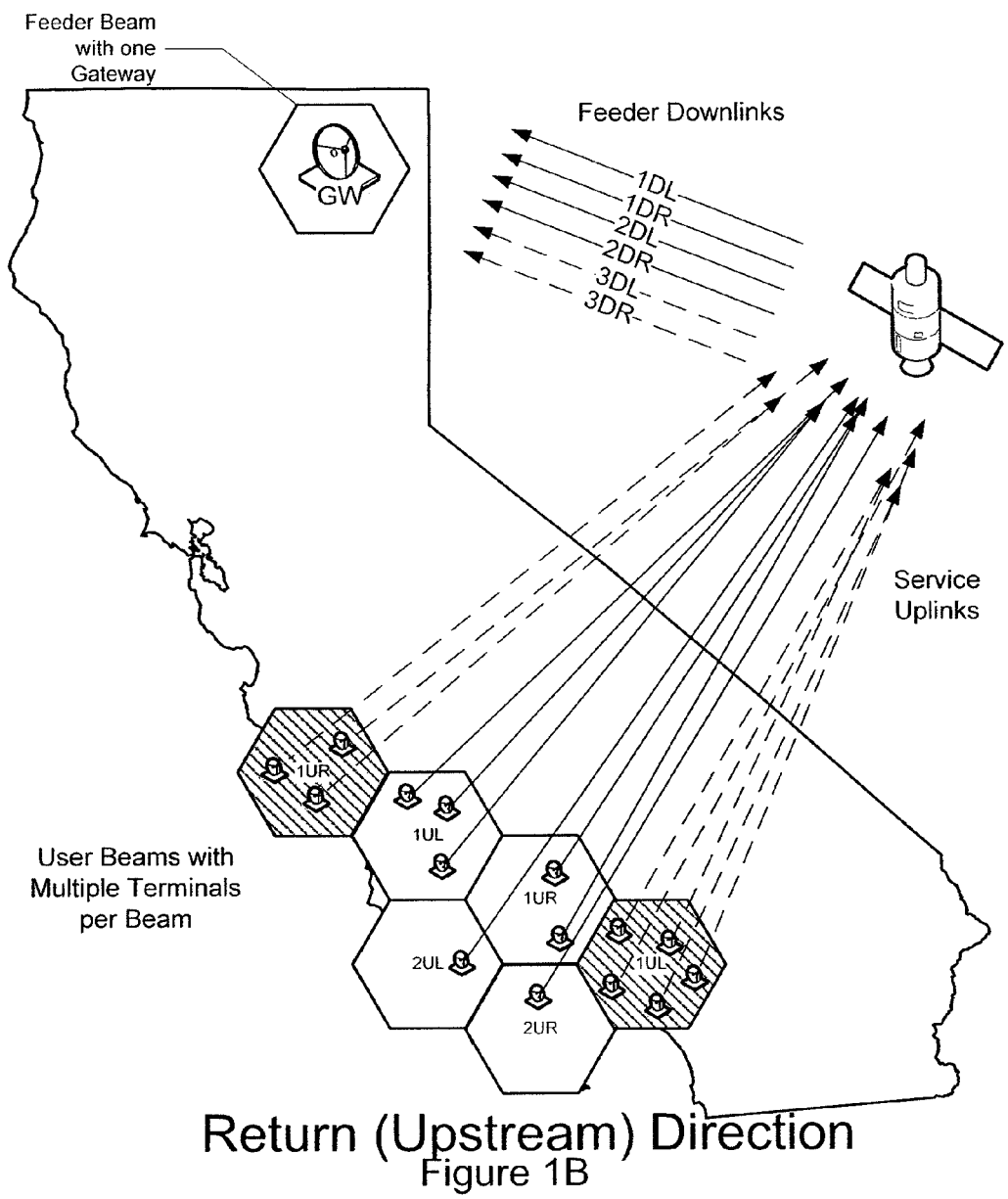

FIGS. 1A and 1B are depictions of a satellite system constructed in accordance with the subject invention. In the northern portion of the depicted area, a gateway GW is constructed within the footprint of a spot beam formed by a directional antenna at a satellite. This beam is called a feeder beam and is composed of feeder uplinks from the gateway to the satellite and feeder downlinks from the satellite to the gateway. There are additional antenna elements on the satellite to produce service beams for the user terminals. The service beams are composed of service downlinks to the user terminals and service uplinks to the satellite. For convenience, service beams are depicted as hexagons, although the beam patterns are dependant on the antenna type and are typically more circular. Multiple user terminals are located within each service beam and communicate to and from the gateway to obtain data services (such as Internet access, etc.) and to implement network control algorithms (e.g., to coordinate the usage of the common return channel among users in the same service beam). The signal colors within the beams are identified by a three character string. The first character identifies the frequency band number (1, 2 or 3). The second character identifies the direction (U for up, D for down). The third character identifies the antenna polarization of the signal (L for left, R for right). Thus, signal 1UL is an uplink signal to the satellite in the first frequency band and it employs left hand polarization.

FIG. 1A shows the path of signals that originate at the gateway and terminate at user terminals, known as the forward or downstream direction. In this example, the service beams support two different frequency bands with two different antenna polarizations, thus forming four color signals that can be used in a four-color reuse pattern among adjacent beams as is well known. In a conventional system, a gateway GW will form four color feeder signals (1UL, 1UR, 2UL, 2UR) that will be relayed by the satellite to the four colors used in the mapping of the service area into service beams (1DL, 1DR, 2DL, 2DR). In accordance with one embodiment of the subject invention, another frequency band is employed on the feeder beams, thus yielding the additional colors 3UL and 3UR as indicated on FIG. 1A with dashed lines. Since there are still only four colors used for the service beams, according to the invention the 3UL and 3UR signals are each translated into one of the service downlink colors, in this example to 1DR and 1DL (shown with dashed lines) to service the corresponding cross-hatched beam areas. In this representative embodiment, all the user terminals in a given service beam target area receive the same downstream signal and extract from it that portion of the signal of interest to it.

FIG. 1B depicts the return path (the upstream direction) from the user or subscriber terminals to the gateway GW. The user terminals transmit separate service uplink signals that are received at a common satellite antenna for each service beam. In this example, in some cases there would be at least six such receiving antennas on the satellite. This composite received signal is then relayed by the satellite down to the gateway GW on the corresponding feeder beam color. As in the forward direction, the color mapping is asymmetrical. In this example service uplink color 1UR is translated to feeder downlink color 3DR, and service uplink color 1UL is translated to feeder downlink color 3DL.

In this application, each gateway GW uses all the available colors for its feeder beam. Thus, to prevent interference, feeder beams must be separated as far away from one another as service beams of like colors are separated via the four color mapping. In the example depicted in FIGS. 1A and 1B, the four unshaded service beams are serviced by one gateway. In a conventional system, adding the additional shaded service beams would require another gateway, spaced well apart from the original gateway GW. In accordance with one embodiment of the present invention, however, the original gateway GW is now able to handle this additional service area.

Figure 2A:
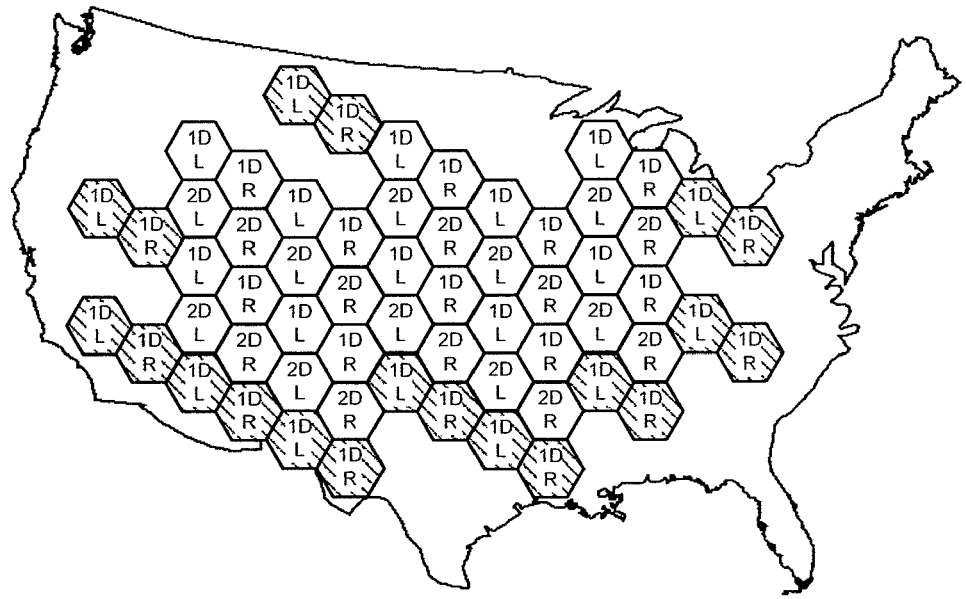
FIG. 2A and FIG. 2B illustrate wide area spot beam service plans as may be serviced by ten gateways according to the invention.
Figure 2B:
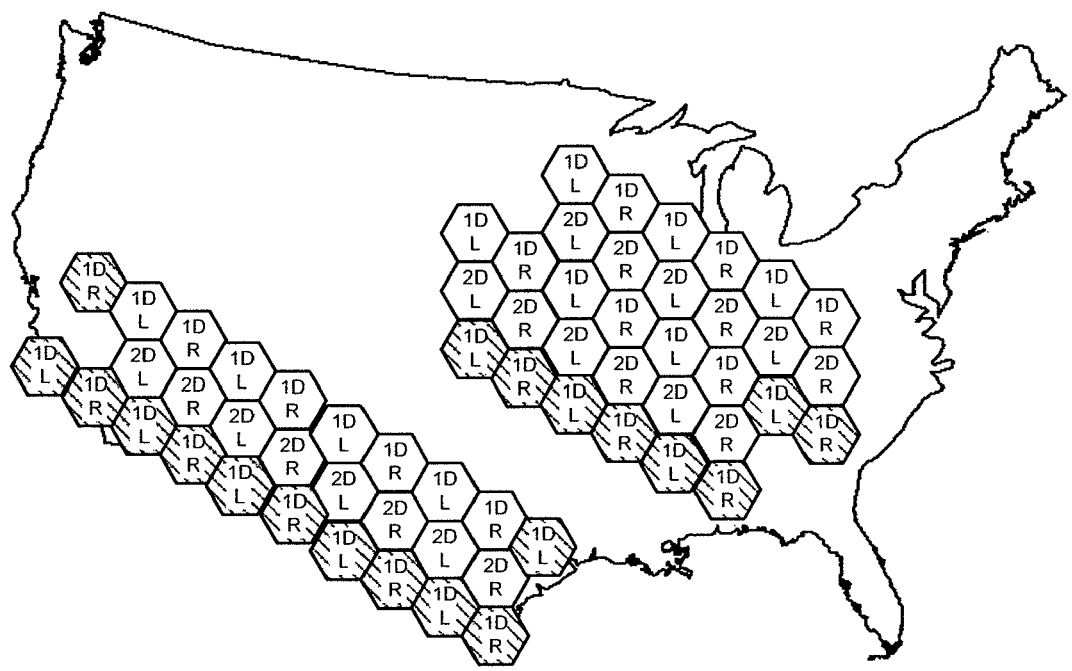

Four color re-use patterns can be used to cover any surface while keeping the distance between like colors at or above a minimum threshold. Depending on the shape of the surface to be covered, however, the numbers of each color required may not be equal. In the system of FIG. 1A, for example, the colors 1DL and 1DR are used twice, while the colors 2DL and 2DR are each used only once. This color ratio phenomenon is illustrated in FIGS. 2A and 2B. In FIG. 2A, one contiguous user area across the continental United States is served by 60 beams with 20 1DL, 20 1DR, 10 2DL and 10 2DR service downlinks. In FIG. 2B, two noncontiguous user areas across a large portion of the continental United States are served by another 60 beams with 20 1DL, 20 1DR, 10 2DL and 10 2DR service downlinks. The gateways are in separate areas for both these figures and are not shown. Notably, only ten gateways are required to handle the sixty downlinks, rather than fifteen under a conventional design.

Figure 3:
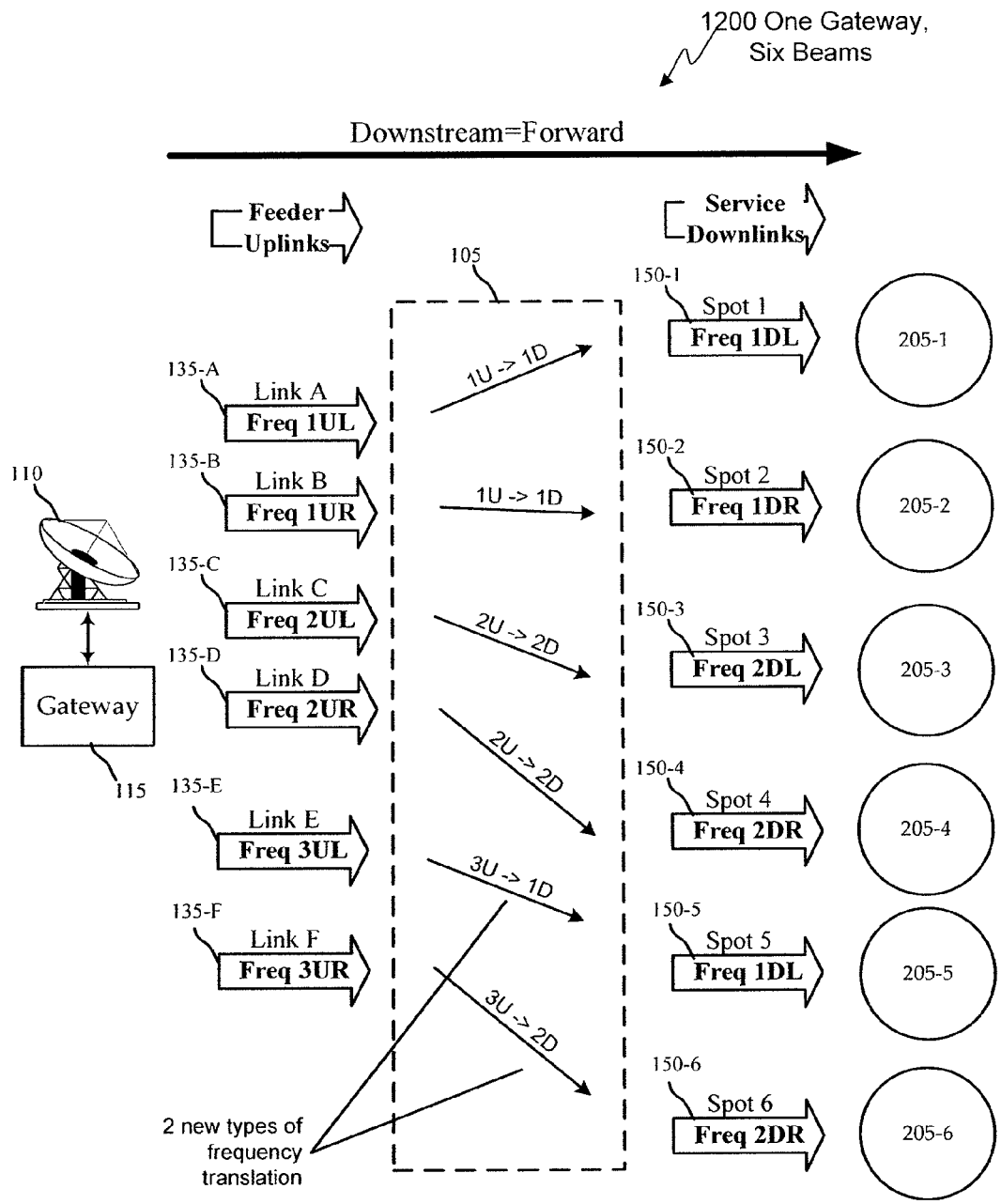
FIG. 3 specifically illustrates service reuse of Frequency 2 Downlink Right Polarization and Frequency 1 Downlink Left Polarization according to the invention.

One exemplary implementation of a portion of a satellite (that portion dedicated to handling the signals from one gateway) built in accordance with the subject invention is shown in functional diagram FIG. 3. With reference to FIG. 3 an embodiment of a forward link distribution system 1200 is shown. The gateway 115 is shown coupled to an antenna subsystem 110, which generates six downstream signals. A single carrier with 500 MHz of spectrum is used for each of the six downstream uplinks 135. In this embodiment, a total of three frequencies and two polarizations allow six separate downstream uplinks 135 while using only 1.5 GHz of the spectrum.

The satellite 105 is functionally depicted as six "bent pipe" connections between a feeder and service link. Carrier frequency can be changed through the satellite 105 "bent pipe" connections along with the orientation of polarization. The satellite 105 converts each downstream uplink 135 signal into a downstream downlink signal 150.

In this embodiment, there are six downstream downlinks 150 that each provides a service link for six spot beams 205.

The downstream downlink 150 may change frequency in the bent pipe as is the case in this embodiment. For example, downstream uplink A 135-A changes from a first frequency (i.e., Freq 1U) to a second frequency (i.e., Freq 1D) through the satellite 105. Other embodiments may also change polarization between the uplink and downlink for a given downstream channel. Some embodiments may use the same polarization and/or frequency for both the uplink and downlink for a given downstream channel.

Here, Links E and F have been added to the Links A-D of a standard symmetric system that would use only two feeder uplink frequency bands. Links E and F use a third frequency band to create two additional transmission signals with corresponding left and right hand polarizations. FIG. 3 also shows the frequency translation occurring on the satellite for each signal path. The first 4 signals are simple translations as discussed before, from the frequency bands 1U and 2U to 1D and 2D, respectively. The third uplink frequency 3U is then translated into 1D in the upper path and 2D in the bottom path. The use of the third frequency has created the need for new frequency translation components, but the total number of frequency translation paths is still fixed at the total number of service beams.

In order to create all 4 colors (1DL, 1DR, 2DL, 2DR) used in the service beams, it is necessary to have two additional frequency translators: 3U->1D and 3U->2D. Each part must be qualified for space and must be spared on the spacecraft for redundancy. By adding one frequency to our feeder beams, the number of frequency translation types has doubled from two to four. The mapping from feeder beams to service beams can be done in any of a number of permutations based on the system requirements.

Figure 4:
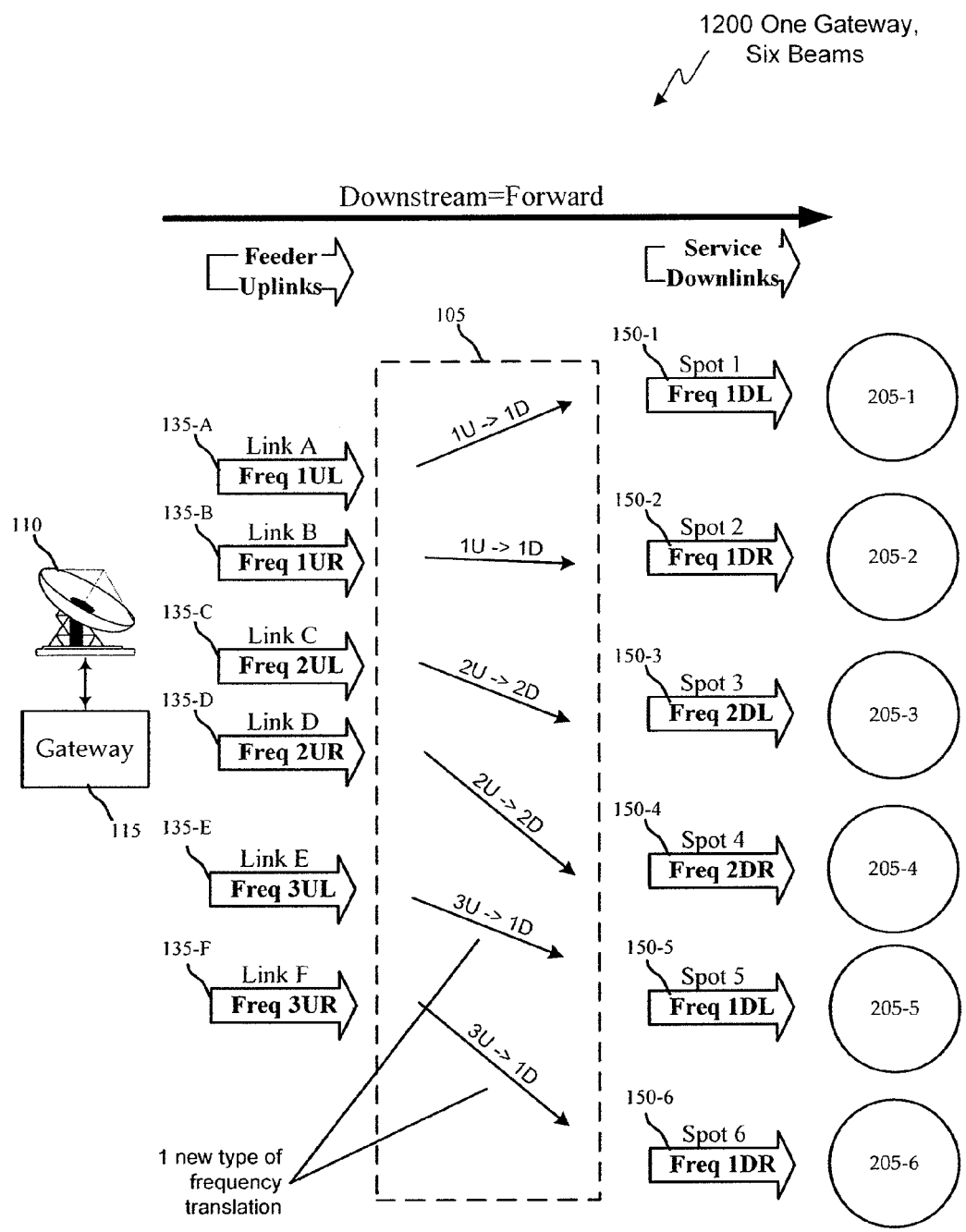
FIG. 4 specifically illustrates service reuse of Frequency 1 Downlink Left Polarization and Frequency 1 Downlink Right Polarization according to the invention.

In accordance with another embodiment of the subject invention, only one additional type of frequency translation is employed on the satellite. As shown in FIG. 4, frequency band 3U is always translated to frequency band 1D. For an exemplary 60 beam system, there will be 40 beams created with the standard translation of 1U->1D and 2U->2D, yielding 10 service beams of each color 1DL, 1DR, 2DL, and 2DR. The 20 remaining beams resulting from the 3U frequency band signals will be evenly divided between 1DL and 1DR, yielding a total of 20 1DL beams, 20 1DR beams, 10 2DL beams and 10 2DR beams.

Figure 5:
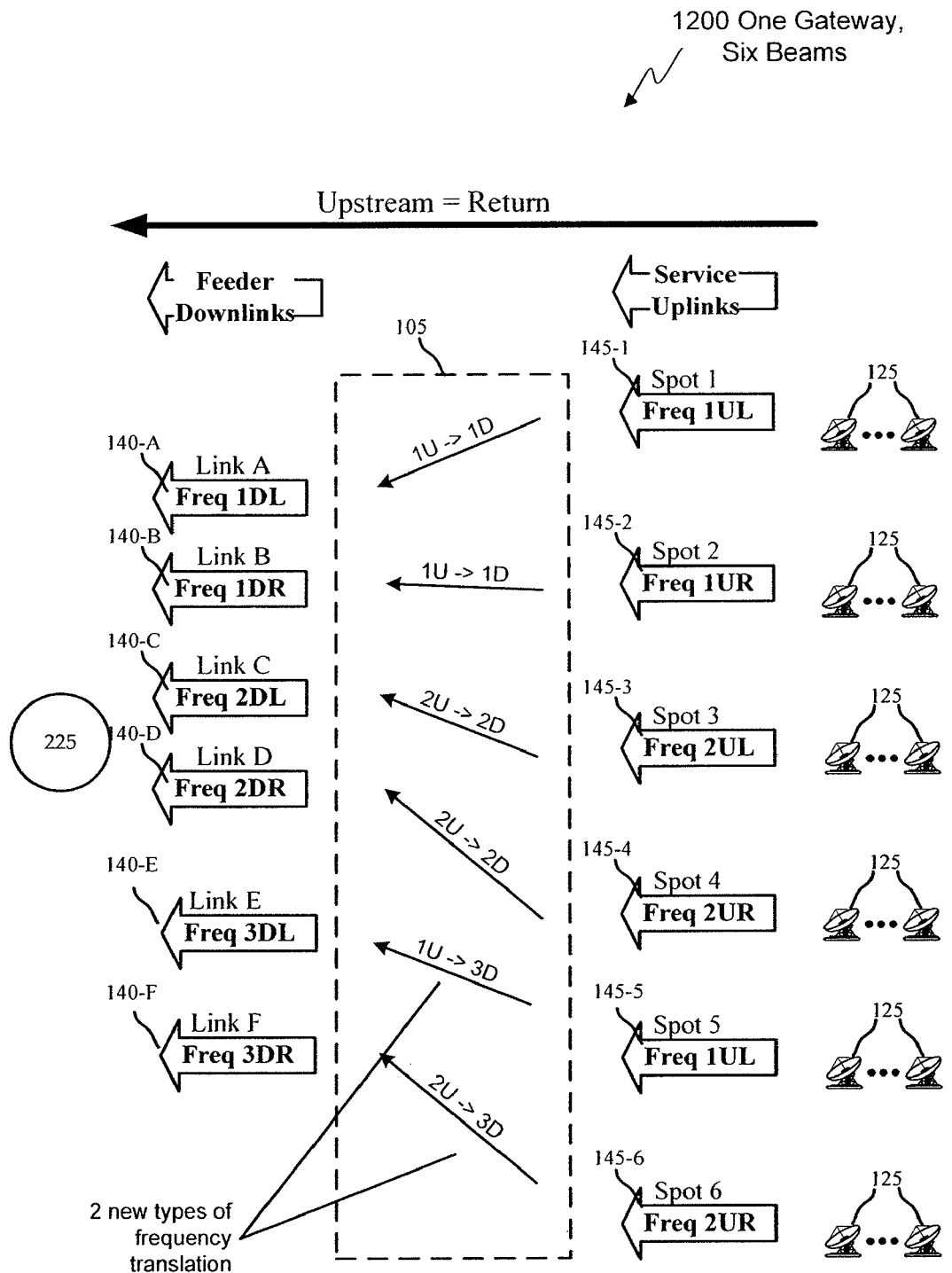
FIG. 5 specifically illustrates service reuse of Frequency 1 Uplink Left Polarization and Frequency 2 Uplink Right Polarization according to the invention.

Referring next to FIG. 5, an embodiment of a return link distribution system is shown. This embodiment shows six upstream uplinks 145 from six sets of subscriber terminals 125. A "bent pipe" satellite 105 takes the upstream uplinks 145, optionally changes carrier frequency and/or polarization (not shown), and then redirects them as upstream downlinks 140 to a spot beam 225. In this embodiment, the carrier frequency changes between the uplink 145 and the downlink 140, but the polarization remains the same. Because the feeder spot beams 225 are not in the coverage area of the service beams, the same frequency pairs may optionally be reused for both service links 145 and feeder links 140 but generally are not reused in this manner.

Here, Links 140-E and 140-F have been added to the Links 140-A to 140-D of a conventional symmetric system that would use only two feeder uplink frequency bands. Links 140-E and 140-F use a third frequency band to create two additional transmission signals with corresponding left and right hand polarizations. FIG. 5 also shows the frequency translation occurring on the satellite for each signal path. The first four signals are simple translations as discussed before, from the frequency bands 1U and 2U into 1D and 2D, respectively. The third uplink frequency 1U is then translated into 3D in the upper path of Link 140-E and from 2U into 3D in the bottom path of Link 140-F. The use of the third frequency on the downlink has created the need for new frequency translation components, but the total number of frequency translation paths is still fixed at the total number of service beams.

In order to convey all 4 colors (1UL, 1UR, 2UL, 2UR) used in service beams to the six colors (1DL, 1DR, 2DL, 2DR, 3DL, 3DR) used in the feeder beams, it is necessary to have two additional frequency translators: 1U->3D and 2U->3D, as shown in FIG. 5. Each part must be qualified for outer space and must be spared on the spacecraft for redundancy. By adding one frequency to the feeder beams, the number of frequency translation types has doubled from two to four. The mapping from feeder beams to service beams can be done in any of a number of permutations based on the system requirements.

Figure 6:
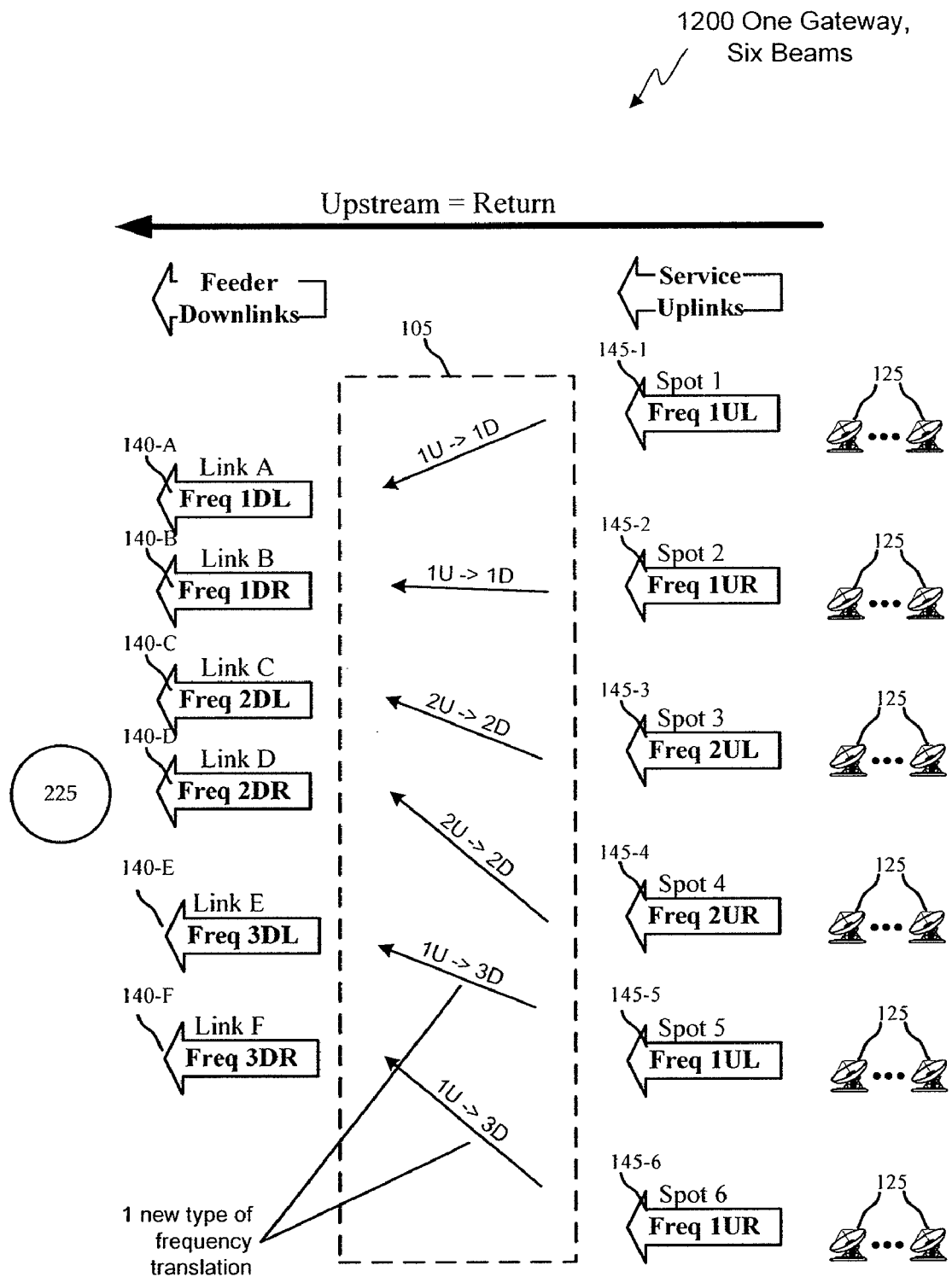
FIG. 6 specifically illustrates reuse of Frequency 1 Uplink Left Polarization and Frequency 1 Uplink Right Polarization according to the invention.

In accordance with another embodiment of the subject invention, only one additional type of frequency translation is employed on the satellite. As shown in FIG. 6, in the third pair of links, Link E and Link F, the single frequency band 1U of Spot 5 and Spot 6 is translated to frequency band 3D. For an exemplary 60 beam system, there will be 40 beams with the standard translation of 1U->1D and 2U->2D, from 10 service uplink beams of each color 1UL, 1UR, 2UL, and 2UR. The 20 remaining beams that result in the 3D frequency band signals will be evenly divided between 1UL and 1UR, yielding a total of 20 1UL beams, 20 1UR beams, 10 2UL beams and 10 2UR beams.

For comparison, an exemplary 60 user beam system, a conventional symmetric 4 color reuse pattern results in the channel mapping shown in Table 1. There 15 Gateways (one per feeder beam) result.

TABLE 1

Symmetric Downstream Service and Feeder Channel Mapping.

| Feeder Beam | | Service Beam | |
|---|---|---|---|
| Number | Color | Color | Number |
| 1 | 1UL | 1DL | 1 |
|   | 1UR | 1DR | 2 |
|   | 2UL | 2DL | 3 |
|   | 2UR | 2DR | 4 |
| 2 | 1UL | 1DL | 5 |
|   | 1UR | 1DR | 6 |
|   | 2UL | 2DL | 7 |
|   | 2UR | 2DR | 8 |
| 3 | 1UL | 1DL | 9 |
|   | 1UR | 1DR | 10 |
|   | 2UL | 2DL | 11 |
|   | 2UR | 2DR | 12 |
| 4 | 1UL | 1DL | 13 |
|   | 1UR | 1DR | 14 |
|   | 2UL | 2DL | 15 |
|   | 2UR | 2DR | 16 |
| 5 | 1UL | 1DL | 17 |
|   | 1UR | 1DR | 18 |
|   | 2UL | 2DL | 19 |
|   | 2UR | 2DR | 20 |
| 6 | 1UL | 1DL | 21 |
|   | 1UR | 1DR | 22 |
|   | 2UL | 2DL | 23 |
|   | 2UR | 2DR | 24 |
| 7 | 1UL | 1DL | 25 |
|   | 1UR | 1DR | 26 |
|   | 2UL | 2DL | 27 |
|   | 2UR | 2DR | 28 |
| 8 | 1UL | 1DL | 29 |
|   | 1UR | 1DR | 30 |
|   | 1UL | 1DL | 31 |
|   | 1UR | 1DR | 32 |
| 9 | 1UL | 1DL | 33 |
|   | 1UR | 1DR | 34 |
|   | 2UL | 2DL | 35 |
|   | 2UR | 2DR | 36 |
| 10 | 1UL | 1DL | 37 |
|   | 1UR | 1DR | 38 |

TABLE 1-continued

Symmetric Downstream Service and Feeder Channel Mapping.

| Feeder Beam | | Service Beam | |
|---|---|---|---|
| Number | Color | Color | Number |
|  | 2UL | 2DL | 39 |
|  | 2UR | 2DR | 40 |
| 11 | 1UL | 1DL | 41 |
|  | 1UR | 1DR | 42 |
|  | 2UL | 2DL | 43 |
|  | 2UR | 2DR | 44 |
| 12 | 1UL | 1DL | 45 |
|  | 1UR | 1DR | 46 |
|  | 2UL | 2DL | 47 |
|  | 2UR | 2DR | 48 |
| 13 | 1UL | 1DL | 49 |
|  | 1UR | 1DR | 50 |
|  | 2UL | 2DL | 51 |
|  | 2UR | 2DR | 52 |
| 14 | 1UL | 1DL | 53 |
|  | 1UR | 1DR | 54 |
|  | 2UL | 2DL | 55 |
|  | 2UR | 2DR | 56 |
| 15 | 1UL | 1DL | 57 |
|  | 1UR | 1DR | 58 |
|  | 2UL | 2DL | 59 |
|  | 2UR | 2DR | 60 |

In accordance with one embodiment of the present invention, however, a 60 user beam system is provided with asymmetric service and feeder beams. Here, four colors are used for the user beams and six colors are used for the feeder beams. Table 2 shows the downstream mapping, as only 10 feeder beams (and thus 10 gateways) generate all 60 signals for the service beams. The first feeder beam contains 6 feeder beam signals that result in four service beams at frequency 1D and two beams at frequency 2D, while the second feeder beam contains 6 feeder beam signals that result in four service beams at frequency 2D and two service beams at frequency 1D. This pattern is repeated four more times in the ten feeder beams, thus generating exactly 30 beams of each frequency (with half of one polarization, half of the other).

TABLE 2

Asymmetric Downstream Service and Feeder Channel Mapping with Equal Color Ratio

| Feeder Beam | | Service Beam | |
|---|---|---|---|
| Number | Color | Color | Number |
| 1 | 1UL | 1DL | 1 |
|  | 1UR | 1DR | 2 |
|  | 2UL | 2DL | 3 |
|  | 2UR | 2DR | 4 |
|  | 3UL | 1DL | 5 |
|  | 3UR | 1DR | 6 |
| 2 | 1UL | 1DL | 7 |
|  | 1UR | 1DR | 8 |
|  | 2UL | 2DL | 9 |
|  | 2UR | 2DR | 10 |
|  | 3UL | 2DL | 11 |
|  | 3UR | 2DR | 12 |
| 3 | 1UL | 1DL | 13 |
|  | 1UR | 1DR | 14 |
|  | 2UL | 2DL | 15 |
|  | 2UR | 2DR | 16 |
|  | 3UL | 1DL | 17 |
|  | 3UR | 1DR | 18 |
| 4 | 1UL | 1DL | 19 |
|  | 1UR | 1DR | 20 |
|  | 2UL | 2DL | 21 |
|  | 2UR | 2DR | 22 |
|  | 3UL | 2DL | 23 |
|  | 3UR | 2DR | 24 |
| 5 | 1UL | 1DL | 25 |
|  | 1UR | 1DR | 26 |
|  | 2UL | 2DL | 27 |
|  | 2UR | 2DR | 28 |
|  | 3UL | 1DL | 29 |
|  | 3UR | 1DR | 30 |
| 6 | 1UL | 1DL | 31 |
|  | 1UR | 1DR | 32 |
|  | 2UL | 2DL | 33 |
|  | 2UR | 2DR | 34 |
|  | 3UL | 2DL | 35 |
|  | 3UR | 2DR | 36 |
| 7 | 1UL | 1DL | 37 |
|  | 1UR | 1DR | 38 |
|  | 2UL | 2DL | 39 |
|  | 2UR | 2DR | 40 |
|  | 3UL | 1DL | 41 |
|  | 3UR | 1DR | 42 |
| 8 | 1UL | 1DL | 43 |
|  | 1UR | 1DR | 44 |
|  | 2UL | 2DL | 45 |
|  | 2UR | 2DR | 46 |
|  | 3UL | 2DL | 47 |
|  | 3UR | 2DR | 48 |
| 9 | 1UL | 1DL | 49 |
|  | 1UR | 1DR | 50 |
|  | 2UL | 2DL | 51 |
|  | 2UR | 2DR | 52 |
|  | 3UL | 1DL | 53 |
|  | 3UR | 1DR | 54 |
| 10 | 1UL | 1DL | 55 |
|  | 1UR | 1DR | 56 |
|  | 2UL | 2DL | 57 |
|  | 2UR | 2DR | 58 |
|  | 3UL | 2DL | 59 |
|  | 3UR | 2DR | 60 |

In accordance with another embodiment of the subject invention, a 60 user beam system is provided with asymmetric service and feeder beams and further employing an unequal ratio of the service beam colors. Again, four colors are used for the user beams and six colors are used for the feeder beams. Table 3 shows the downstream mapping as again only 10 feeder beams (and thus 10 gateways) generate all 60 signals for the service beams. All feeder beams now contain six feeder beam signals that result in four service beams at frequency 1D and two service beams at frequency 2D, thus generating 40 beams at frequency 1D and 20 beams at frequency 2D. Half of these beams will be of one polarization, half of the other.

TABLE 3

Asymmetric Downstream Service and Feeder Channel Mapping with Unequal Color Ratio

| Feeder Beam | | Service Beam | |
|---|---|---|---|
| Number | Color | Color | Number |
| 1 | 1UL | 1DL | 1 |
|  | 1UR | 1DR | 2 |
|  | 2UL | 2DL | 3 |
|  | 2UR | 2DR | 4 |
|  | 3UL | 1DL | 5 |
|  | 3UR | 1DR | 6 |

TABLE 3-continued

Asymmetric Downstream Service and Feeder Channel Mapping with Unequal Color Ratio

| Feeder Beam | | Service Beam | |
|---|---|---|---|
| Number | Color | Color | Number |
| 2 | 1UL | 1DL | 7 |
|   | 1UR | 1DR | 8 |
|   | 2UL | 2DL | 9 |
|   | 2UR | 2DR | 10 |
|   | 3UL | 1DL | 11 |
|   | 3UR | 1DR | 12 |
| 3 | 1UL | 1DL | 13 |
|   | 1UR | 1DR | 14 |
|   | 2UL | 2DL | 15 |
|   | 2UR | 2DR | 16 |
|   | 3UL | 1DL | 17 |
|   | 3UR | 1DR | 18 |
| 4 | 1UL | 1DL | 19 |
|   | 1UR | 1DR | 20 |
|   | 2UL | 2DL | 21 |
|   | 2UR | 2DR | 22 |
|   | 3UL | 1DL | 23 |
|   | 3UR | 1DR | 24 |
| 5 | 1UL | 1DL | 25 |
|   | 1UR | 1DR | 26 |
|   | 2UL | 2DL | 27 |
|   | 2UR | 2DR | 28 |
|   | 3UL | 1DL | 29 |
|   | 3UR | 1DR | 30 |
| 6 | 1UL | 1DL | 31 |
|   | 1UR | 1DR | 32 |
|   | 2UL | 2DL | 33 |
|   | 2UR | 2DR | 34 |
|   | 3UL | 1DL | 35 |
|   | 3UR | 1DR | 36 |
| 7 | 1UL | 1DL | 37 |
|   | 1UR | 1DR | 38 |
|   | 2UL | 2DL | 39 |
|   | 2UR | 2DR | 40 |
|   | 3UL | 1DL | 41 |
|   | 3UR | 1DR | 42 |
| 8 | 1UL | 1DL | 43 |
|   | 1UR | 1DR | 44 |
|   | 2UL | 2DL | 45 |
|   | 2UR | 2DR | 46 |
|   | 3UL | 1DL | 47 |
|   | 3UR | 1DR | 48 |
| 9 | 1UL | 1DL | 49 |
|   | 1UR | 1DR | 50 |
|   | 2UL | 2DL | 51 |
|   | 2UR | 2DR | 52 |
|   | 3UL | 1DL | 53 |
|   | 3UR | 1DR | 54 |
| 10 | 1UL | 1DL | 55 |
|   | 1UR | 1DR | 56 |
|   | 2UL | 2DL | 57 |
|   | 2UR | 2DR | 58 |
|   | 3UL | 1DL | 59 |
|   | 3UR | 1DR | 60 |

Figure 7:
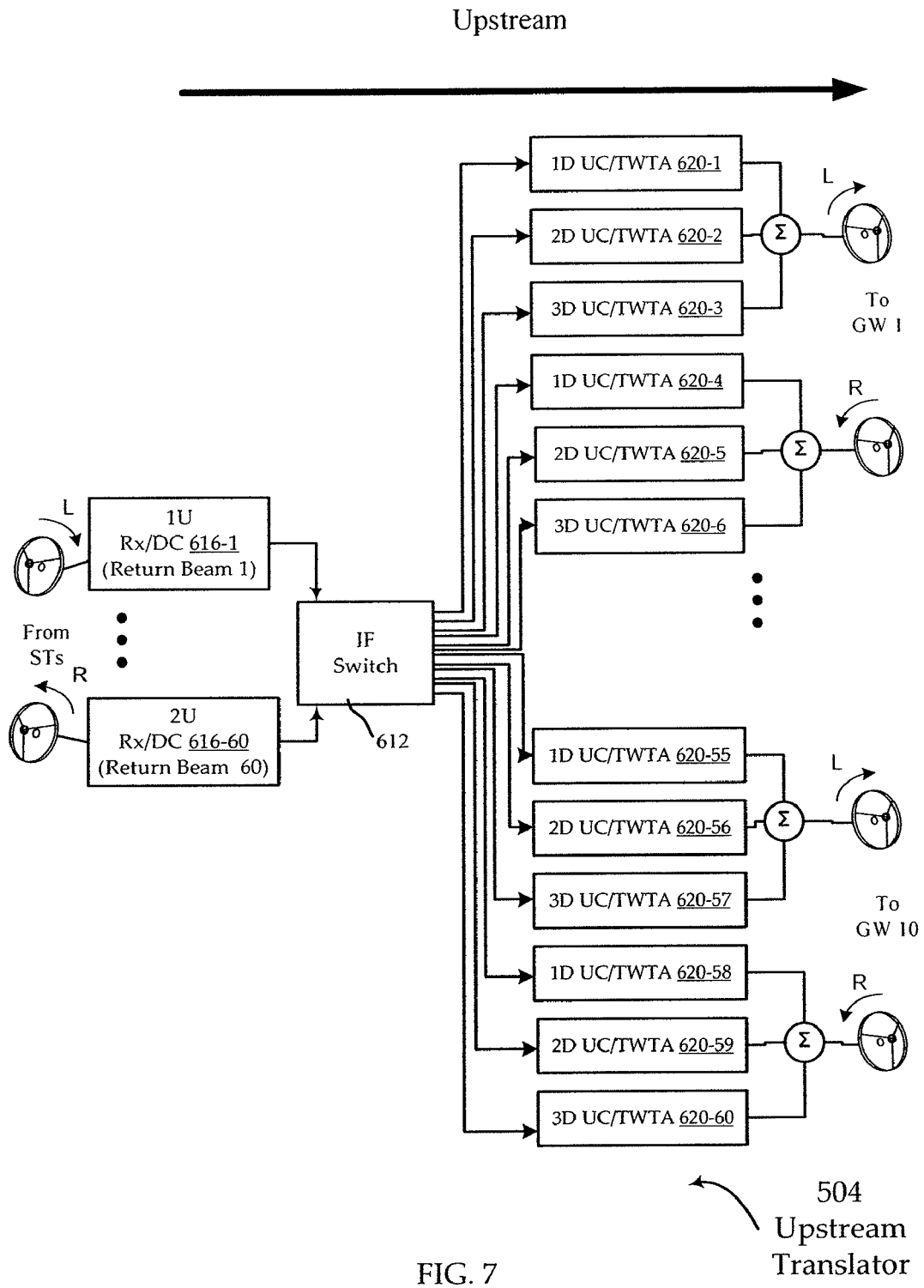
FIG. 7 is a depiction of an upstream translator according to the invention.

With reference to FIG. 7, an embodiment of an upstream translator 504 is shown in block diagram form. Receiver and Downconverter (Rx/DC) blocks 616-1 through 616-60 each receives all the return link information for the area defined by a service spot beam (as previously explained) as an analog signal before conversion to an intermediate frequency (IF). There is a Rx/DC block 616 for each service spot beam area. An IF switch 612 routes a particular baseband signal from a Rx/DC block 616-1 through 616-60 to a particular upstream downlink channel. The upstream downlink feeder channel is filled using an Upconverted and Traveling Wave Tube Amplifier (UC/TWTA) block 620-1 through 620-60. The frequency and/or polarization can be changed through this process such that each upstream channel passes through the satellite 105 in a bent pipe fashion.

Gateway 1 has six UC/TWTA blocks 620-1 through 620-6 dedicated to it within the upstream translator 504. Three of the six dedicated UC/TWTA blocks 620-1 through 620-3 operate at a first set of three frequencies to feeds with left hand polarization and three UC/TWTA blocks 620-4 through 620-6 operate at the same first set of frequencies to feeds with right hand polarization. Each of the ten blocks of six traveling wave tubes are similarly configured, for example with UC/TWTA 620-55, 620-56 and 620-57 mated with UC/TWTA 620-58, 620-59 and 620-60. Between the two polarizations and three frequencies for each grouping of traveling wave tubes, the satellite 105 can communicate with a corresponding gateway 115 with six separate upstream downlink feeder channels.

Figure 8:
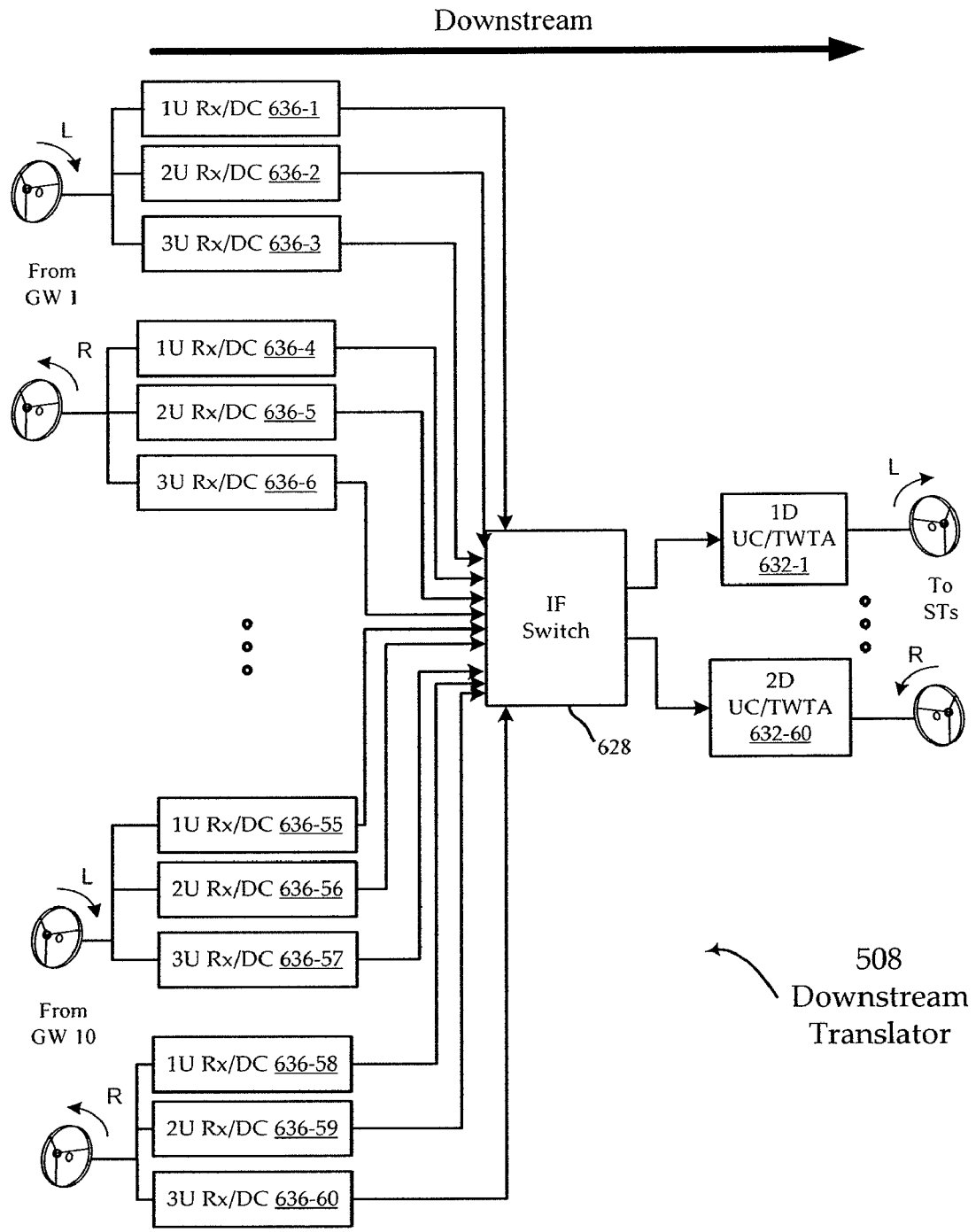
FIG. 8 is a depiction of a downstream translator according to the invention.

Referring next to FIG. 8, an embodiment of a downstream translator 508 is shown as a block diagram. Each gateway 115 generates six downstream uplink service channels to the satellite 105 by use of three frequency ranges and two polarizations. A Rx/DC block 636-1 through 636-60 takes the analog signal from the spot beam antenna serving the corresponding gateway GW1 through GW10 and converts the signal to an intermediate frequency. There is a Rx/DC block 636 for all sixty downstream uplink service channels from the ten gateways 115. An IF switch 628 connects a particular channel from a gateway 115 to a particular service spot beam via a spot beam antenna. Each IF signal from the switch 628 is up-converted and amplified with a UC/TWTA block 632-1 through 632-60, with a particular frequency. The sixty spot beam antennas broadcasts the properly polarized signals to the designated cell or spot beam regions containing subscriber terminals. Just as with the upstream translator 504, the downstream translator 508 can change carrier frequency and polarization of a particular downstream channel in a bent-pipe fashion.

An exemplary asymmetric frequency and polarization table is illustrated below. Here, the 'colors' of signals are denoted by a three character symbol. For example, the first color is 1UL—the first uplink frequency band (28.1-28.6 GHz in this example).

| Signal | 18.3-18.8 GHz | 18.8-19.3 GHz | 19.7-20.2 GHz | 28.1-28.6 GHz | 28.6-29.1 GHz | 29.5-30.0 GHz |
|---|---|---|---|---|---|---|
| Uplink Feeder |  |  |  | 1UL | 2UL | 3UL |
|  |  |  |  | 1UR | 2UR | 3UR |
| Downlink Service | 1DL | 2DL |  |  |  |  |
|  | 1DR | 2DR |  |  |  |  |
| Uplink Service |  |  |  | 1UL | 2UL |  |
|  |  |  |  | 1UR | 2UR |  |
| Downlink Feeder | 1DL | 2DL | 3DL |  |  |  |
|  | 1DR | 2DR | 3DR |  |  |  |

While the present invention has been described in terms of specific embodiments, it should be apparent to those skilled in the art that the scope of the present invention is not limited to the described specific embodiments. The specification and drawings are, accordingly, to be regarded in an illustrative rather than a restrictive sense. It will, however, be evident that additions, subtractions, substitutions, and other modifications may be made without departing from the broader spirit and scope of the invention as set forth in the claims.

What is claimed is:

1. In a satellite communication system, a method for communicating between a central source and a plurality of user terminals via feeder frequency bands and service frequency bands, said method comprising:
   causing the generating of uplink feeder beams and downlink feeder beams, said uplink feeder beams and downlink feeder beams being associated with a plurality of gateways via a translator satellite having a different number of receivers than transmitters, said uplink feeder beams and said downlink feeder beams being characterized by a selection of feeder signals of first frequencies and first polarization slots, and each said feeder signal corresponding with a different color in a first selection of colors in a color map, each color being characterized by a unique frequency band and unique signal polarization; and
   causing the generating of a plurality of uplink service beams and downlink service beams, said uplink service beams and downlink service beams being associated with a plurality of user subscriber terminals via the satellite, said service beams being characterized by a selection of second frequencies and second polarization slots, the number of said second frequencies and second polarizations being less than the number of said first frequencies and said first polarizations and each said feeder signal corresponding with a different color in a second selection of colors in said color map, said second color selection being less in number than said first color selection, such that the feeder frequency bands and the service frequency bands are asymmetric among available frequency channels for communicating with enhanced efficiency between a central source and a plurality of user terminals via feeder frequency bands and service frequency bands.

2. The method according to claim 1, further including the step of:
   causing the reusing frequencies in the feeder beams between said satellite and said plurality of gateways, wherein the gateway beams transmit transmitting to and from the satellite re-using at least one common frequency channel of the feeder beams, such that allocation of frequency and polarization slots of the feeder beams is asymmetric.

3. In a satellite communication system having a method for communicating between a central source and a plurality of user terminals via feeder frequency bands and service frequency bands, the improvement in the method comprising:
   modifying a four-color reuse pattern for assigning spot coverage areas so that the ratio of a select group of the four colors in the pattern is not equal, thereby allowing for asymmetric service frequency usage on service downlinks and thereby requiring fewer than conventional numbers of types of frequency translators;
   wherein uplink service links being caused to employ three identical frequency bandwidths, each with two orthogonal polarizations, and downlink feeder links employ two frequency bandwidths, each with two orthogonal polarizations, and wherein the frequency bandwidths between the uplink feeder links and the downlink feeder links are being caused to be reused asymmetrically to reduce the required number of separate and unique elements on a satellite.

4. In a satellite communication system having a method for communicating between a central source and a plurality of user terminals via feeder frequency bands and se ice frequency bands, the improvement in the method comprising:
   modifying a four-color reuse pattern for assigning spot coverage areas so that the ratio of a select group of the four colors in the pattern is not equal, thereby allowing for asymmetric service frequency usage on service downlinks and thereby requiring fewer than conventional numbers of types of frequency translators;
   wherein at least one uplink feeder beam comprises comprising six carriers, wherein the beam comprises comprising three frequency channels, each of the three frequency channels being operatively separated by right hand circular polarization (RHCP) and left hand circular polarization (LHCP), to form six unique combinations of frequency and polarization (colors), and wherein each of the six carriers is being caused to transmitted transmit using only one of the six unique combinations of frequency and polarization.

5. In a satellite communication system having a method for communicating between a central source and a plurality of user terminals via feeder frequency bands and service frequency bands, the improvement in the method comprising:
   modifying a four-color reuse pattern for assigning spot coverage areas so that the ratio of a select group of the four colors in the pattern is not equal, thereby allowing for asymmetric service frequency usage on service downlinks and thereby requiring fewer than conventional numbers of types of frequency translators;
   wherein the downlink service beams include including one of four carriers, wherein the carriers are being chosen from two frequency bands, each of the two frequency bands being capable of being separated by right hand circular polarization (RHCP) and left hand circular polarization (LHCP), to form four unique combinations of frequency and polarization (colors), and wherein each of the four carriers is transmitted using one of the four unique combinations of frequency and polarization to spot beam cells according to the four color pattern.

6. A satellite communication system for communicating between a central source gateway and a plurality of user terminals via feeder frequency bands and service frequency bands, said system comprising:
   a gateway ground station configured for generating uplink feeder beams and downlink feeder beams via a bent-pipe transponder satellite, said uplink feeder beams and said downlink feeder beams being characterized by a selection of feeder signals of first frequencies and first polarization slots, and each said feeder signal corresponding with a different color in a first selection of colors in a color map, each color being characterized by a unique frequency band and unique signal polarization; and
   a plurality of user subscriber terminals remote from the gateway configured for generating a plurality of uplink service beams and downlink service beams, said uplink service beams and said downlink service beams being characterized by a selection of second frequencies and second polarization slots, and each said feeder signal corresponding with a different color in a second selection of colors in said color map, said second color selection being less in number than said first color selection;

such that the feeder frequency bands and the service frequency bands are asymmetric among available frequency channels.

7. The system according to claim 6, further comprising:
a controller configured for reusing frequencies in the feeder beams between said satellite and said plurality of gateways, wherein the gateway beams being configured to transmit to and from the satellite re-using at least one common frequency channel of the feeder beams, such that allocation of frequency and polarization slots of the feeder beams is asymmetric in accordance with a four-color color reuse pattern employed for assigning spot coverage areas.

8. The system according to claim 7, wherein uplink service links being caused to employ three identical frequency bandwidths, each with two orthogonal polarizations, and downlink feeder links being caused to employ two frequency bandwidths, each with two orthogonal polarizations, and wherein the frequency bandwidths between the uplink feeder links and the downlink feeder links are being caused to be reused asymmetrically to reduce the required number of separate and unique elements on a satellite.

9. The system according to claim 7, wherein at least one uplink feeder beam comprises comprising six carriers, wherein the beam comprises each with three potential frequency channels, each of the three frequency channels being operatively separated by right hand circular polarization (RHCP) and left hand circular polarization (LHCP), to form six unique possible combinations of frequency and polarization (colors), and wherein each of the six carriers is transmitted being caused to transmit using only one of the six unique possible combinations of frequency and polarization.

10. The system according to claim 7, wherein the downlink service beams being caused to include one of four carriers, wherein the carriers are chosen from two frequency bands, each of the two frequency bands being capable of being separated by right hand circular polarization (RHCP) and left hand circular polarization (LHCP), to form four unique combinations of frequency and polarization (colors), and wherein each of the four carriers is being caused to be transmitted using one of the four unique combinations of frequency and polarization to spot beam cells according to the four color pattern.

11. A method for communicating via a satellite communication system, the method comprising:
communicating a plurality of uplink feeder beams from a gateway to a satellite, each of the plurality of uplink feeder beams being associated with a different uplink color in a first selection of colors in a uplink color map, each of the different uplink colors being characterized by one of a set of unique uplink frequency bands and unique uplink signal polarizations; and
causing the communicating of a plurality of downlink service beams from the satellite to a plurality of user terminals each of the plurality of downlink service beams being associated with a different downlink color in a second selection of colors in a downlink color map, each of the different downlink colors being characterized by one of a set of unique downlink frequency bands and unique signal downlink polarizations the second selection of colors being less in number than the first selection of colors.

12. A satellite communication system comprising:
a gateway configured to communicate a plurality of uplink feeder beams to a satellite, each of the plurality of uplink feeder beams associated with a different uplink color in a first selection of colors in an uplink color map, each of the different uplink colors being characterized by one of a set of uplink unique frequency bands and unique uplink signal polarizations; and
a plurality of user terminals configured to receive a plurality of downlink service beams from the satellite, each of the plurality of downlink service beams associated with a different downlink color in a second selection of colors in a downlink color map, each of the different downlink colors being characterized by one of a set of unique downlink frequency bands and unique downlink signal polarizations, the first selection of colors being more in number than the second selection of colors.

13. A satellite communication system, comprising:
means for communicating a plurality of uplink feeder beams from a gateway to a satellite, each of the plurality of uplink feeder beams being associated with a different uplink color in a first selection of colors in an uplink color map, each of the different uplink colors being characterized by one of a set of unique uplink frequency bands and unique uplink signal polarizations; and
means for communicating a plurality of downlink service beams from the satellite to a plurality of user terminals, each of the plurality of downlink service beam being associated with a different downlink color in a second selection of colors in a downlink color map, each of the different downlink colors being characterized by one of a set of unique downlink frequency bands and unique downlink signal polarizations, the first selection of colors being more in number than the second selection of colors.

* * * * *